(12) United States Patent
Hahn et al.

(10) Patent No.: US 6,205,406 B1
(45) Date of Patent: Mar. 20, 2001

(54) OPTICAL SCANNER ALIGNMENT INDICATOR METHOD AND APPARATUS

(75) Inventors: James C. Hahn, Delran; David P. Bubnoski, Marlton, both of NJ (US); Anatoly Kotlarsky, Holland, PA (US)

(73) Assignee: Auto Image ID, Inc., Cherry Hill, NJ (US)

( * ) Notice: Subject to any disclaimer, the term of this patent is extended or adjusted under 35 U.S.C. 154(b) by 0 days.

(21) Appl. No.: 09/071,687

(22) Filed: May 1, 1998

(51) Int. Cl.$^7$ ........................................ G06F 19/00
(52) U.S. Cl. ................................. 702/85; 250/200
(58) Field of Search ........................... 700/114, 115, 700/116, 117, 228, 229, 230, 259; 250/214, 363.02, 559, 200, 203.1; 33/506, 290; 348/94, 95; 369/275.1; 116/1; 396/89, 373; 359/197, 534, 642; 356/127, 138; 264/1.1; 395/12; D16/100, 130; 385/14; D10/46; 435/808; 333/248; 382/312

(56) References Cited

U.S. PATENT DOCUMENTS 3,818,191 * 6/1974 Fennema et al. ............. 235/61.11 E
4,356,393 * 10/1982 Fayfield ........................... 250/214 R
5,016,109 * 5/1991 Gaylord ................................. 358/225
5,687,249 * 11/1997 Kato ..................................... 382/104

\* cited by examiner

*Primary Examiner*—Kamini Shah
*Assistant Examiner*—Edward Raymond
(74) *Attorney, Agent, or Firm*—Woodcock Washburn Kurtz Mackiewicz & Norris (57) ABSTRACT

A method and apparatus for aligning a target within a field of view of an optical scanner is provided. In an optical scanner having a field of view, apparatus for indicating whether a target is aligned within said field of view includes a microprocessor and an alignment indicator. The alignment indicator is electrically connected to the microprocessor and includes, for example, a light emitting diode. The microprocessor defines a first zone and a second zone within the field of view and determines whether the target is within the field of view. If the target is within the field of view, the microprocessor identifies a target alignment point on the target. The microprocessor determines whether the target alignment point is within either the first zone or the second zone and sends a signal to the alignment indicator. In response, the alignment indicator provides an indication indicating whether the target alignment point is located within the first zone, the second zone, or neither.

35 Claims, 5 Drawing Sheets

OPTICAL SCANNER ALIGNMENT INDICATOR METHOD AND APPARATUS

FIELD OF THE INVENTION

The present invention relates to optical scanners. More particularly, the present invention relates to a method and apparatus for indicating whether a selected point on a target is within a predefined region in an optical scanner's field of view.

BACKGROUND OF THE INVENTION

To identify certain objects, such as electronic components, many industries, such as the automotive and electronics industries, often use indicia, such as bar codes or data matrix codes, etched onto the surface of the object. Typically, these indicia represent data used to identify the objects and, particularly in the case of electronic components, to accurately position the components during assembly. Generally, the indicia, or targets, are read by an optical scanner, positioned over the object.

Identification of objects is rapidly becoming a critical issue in the manufacture and sale of miniature components, particularly in the electronics industry. Identification is used to track faulty components during automated manufacturing processes. For example, it is costly to apply subsequent steps of the manufacturing process on a component that has been identified as faulty at an earlier step. By reading the identity of the component before each step is applied, an automated manufacturing process can determine whether the component is faulty and, consequently, whether to apply the current step. Thus, if a component is identified as faulty during one step of the manufacturing process, it can be ignored at all subsequent steps.

Similarly, object identification is also desirable in order to trace components once they have been shipped into the field. If a problem develops with a component in the field, the identification on the component provides a key to accessing historical information retained on the component at the factory. This historical information is invaluable in troubleshooting problems in the field.

One object identification technique that has been used with great success is the etching of bar codes onto the objects' surfaces. However, as components become smaller, it is necessary to fit more data into less surface area. In response, the etching of data matrix codes onto the objects' surfaces has begun to emerge as a preferred identification technique. Due to the large amount of data stored in such a small area, it is important that the image provided to the camera be as accurate as possible. To produce an accurate image, it is important to ensure that the target is aligned properly in the scanner's field of view.

A typical prior art optical scanner comprises a light source, a lens, an image sensor, an analog-to-digital (A/D) convertor, and a microprocessor. Such a scanner may also comprise either a serial output interface, or a video image monitor (VIM) interface, or both.

The serial output interface is connected to a video display terminal. The VIM interface comprises a memory buffer and is electrically connected to a VIM. In operation, the scanner is located above a moving surface, such as a conveyor belt. Objects, such as electronic components, are located on the moving surface. A target, such as a data matrix code symbol, or other indicia typically used for identification, is located on the surface of each object.

It is the purpose of an optical scanner to locate the target and process an image thereof to extract the data contained in the target's image. Incident light from the light source is reflected off of the target. The reflected light is directed toward the lens, which focuses the reflected light and directs the focused light toward the image sensor. The image sensor comprises an array of pixels, each of which receives a portion of focused light. The image sensor may be, for example, a charge coupled device (CCD). The image sensor outputs to the A/D convertor 140 an analog signal representing the intensity of the light received by each pixel. The A/D convertor digitizes the analog signal and forwards the digital signal to the microprocessor. The microprocessor processes the digital signal and, among other things, locates the target within the scanner's field of view. The field of view is defined to be the area that can be imaged onto the image sensor by the lens.

As the moving surface moves past the scanner, objects move past the scanner as well. Typically, the location of the objects on the moving surface is well known. Similarly, the location of the target on an object is substantially the same for each object. In operation, it is desirable that the targets be aligned within the field of view as the objects move past the scanner. Thus, once the scanner is situated such that a first target is aligned within the field of view, the scanner can remain fixed and continue to scan subsequent targets accurately. Throughout the process of aligning the targets properly within the field of view, the scanner is in an alignment mode.

While the scanner is in alignment mode, data representing the location of the target within the field of view may be transmitted from the microprocessor via the serial output interface to a video display terminal. Thus, a user familiar with reading such data can adjust the scanner until the target is aligned properly within the field of view. Typically, it is desirable that the center of the target be aligned in the center of the field of view, although, particularly if the target is irregular in shape, the user may align any point on the target on any point within the field of view.

Similarly, data representing the field of view is stored within a memory buffer and may be transmitted from the microprocessor via the VIM interface to a video image monitor. In that case, the video image monitor displays a video image of the field of view. Thus, a user can then view the VIM to determine the location of the target within the field of view and adjust the scanner 100 until the target is aligned properly within the field of view.

This approach has several known disadvantages. This approach requires additional circuitry in the scanner to interface with and control the display terminals. This approach requires an additional memory buffer within the scanner to store the video data before it is forwarded to the display terminal. This approach requires enough table space to accommodate the video terminal. This approach requires the user to look at the target and the display terminal. Thus, not only does this approach requires costly hardware (e.g., the display terminals and connections from the scanner thereto) and buffer memory, it also requires significant table space and is cumbersome to use.

Thus, there is a need in the art for a method and apparatus that reduce the hardware costs, memory, and complexity associated with aligning a target within an optical scanner's field of view.

SUMMARY OF THE INVENTION

The present invention satisfies these needs in the art by providing a method and apparatus for aligning a target within a field of view of an optical scanner. In an optical scanner having a field of view, apparatus for indicating whether a target is aligned within said field of view comprises a microprocessor and an alignment indicator. The alignment indicator is electrically connected to the microprocessor and, in a preferred embodiment, comprises a light emitting diode (LED).

The microprocessor defines a first zone and a second zone within the field of view and determines whether the target is within the field of view. If the target is within the field of view, the microprocessor identifies a target alignment point on the target. In a preferred embodiment, the target alignment point is a geometric center point or center of gravity point on the target.

The microprocessor determines whether the target alignment point is within either the first zone or the second zone. If the target alignment point is within the first zone, the microprocessor sends a first signal to the alignment indicator. If the target alignment point is within the second zone, the microprocessor sends a second signal to the alignment indicator. If the target alignment point is not within either the first zone or the second zone, the microprocessor sends a third signal to the alignment indicator.

The alignment indicator receives the signal from the microprocessor. In response to the first signal, the alignment indicator provides an indication, for example, lighting the LED. In response to the second signal, the alignment indicator provides another indication, for example, blinking the LED. In response to the third signal, the alignment indicator provides still another indication, for example, turning off the LED.

BRIEF DESCRIPTION OF THE DRAWINGS

The present invention will be better understood, and its numerous objects and advantages will become apparent by reference to the following detailed description of the invention when taken in conjunction with the following drawings, in which.

DETAILED DESCRIPTION OF THE PREFERRED EMBODIMENTS

A method and apparatus which meet the above-mentioned objects and provide other beneficial features in accordance with the presently preferred exemplary embodiment of the invention will be described below with reference to FIGS. 1–4. Those skilled in the art will readily appreciate that the description given herein with respect to those figures is for explanatory purposes only and is not intended in any way to limit the scope of the invention. Accordingly, all questions regarding the scope of the invention should be resolved by referring to the appended claims.

Figure 1:
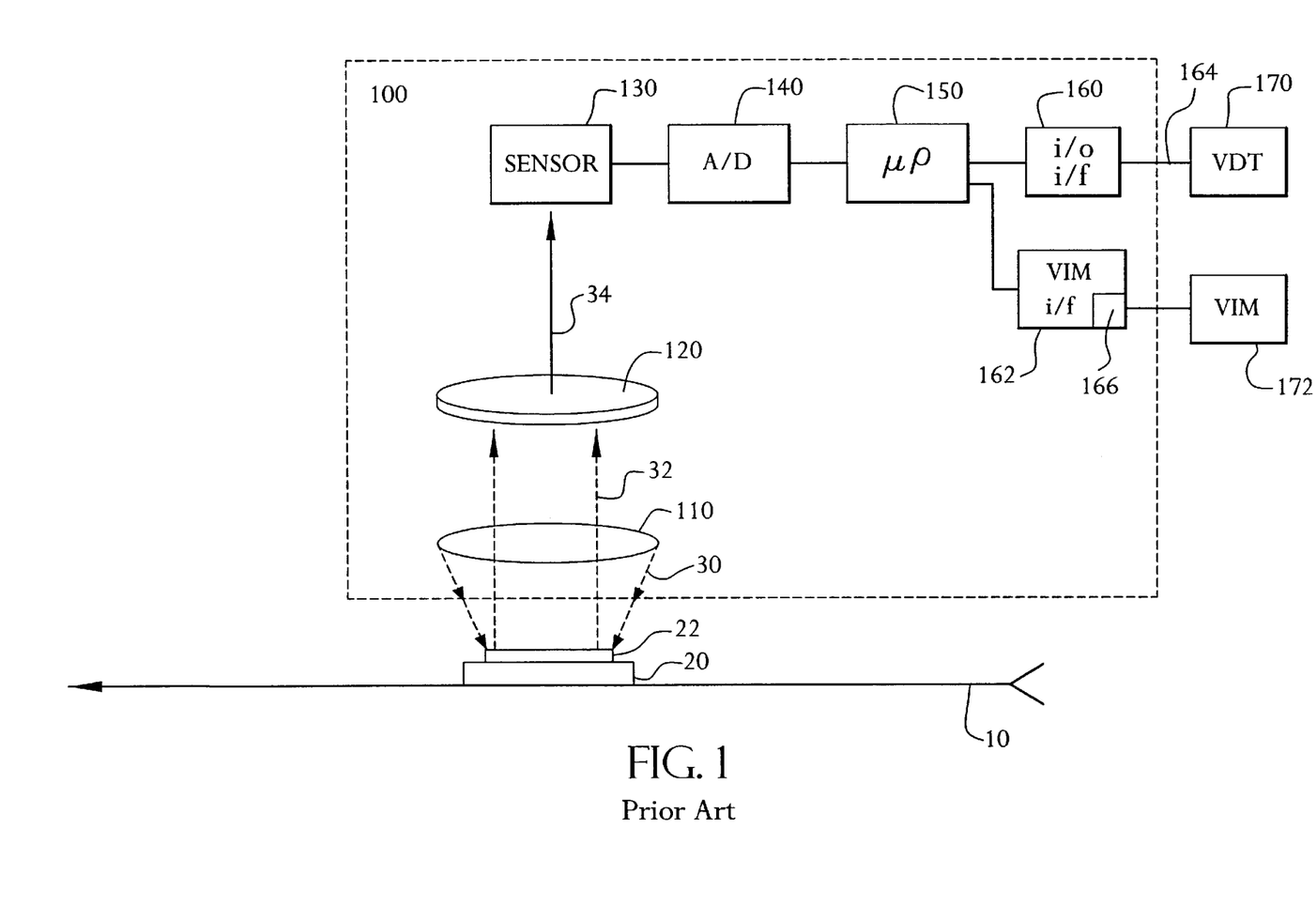
FIG. 1 shows a diagram of a prior art optical scanner.

FIG. 1 shows a diagram of a prior art optical scanner 100. Scanner 100 comprises a light source 110, a lens 120, an image sensor 130, an analog-to-digital (A/D) convertor 140, and a microprocessor 150. Scanner 100 may also comprise either a serial output interface 160, or a video image monitor (VIM) interface 162, or both. Serial output interface 160 is connected via connector 164 to video display terminal 170. VIM interface 162 comprises a memory buffer 166 and is electrically connected to VIM 172. As shown in FIG. 1, scanner 100 is located above a moving surface 10, such as a conveyor belt. Objects 20 are located on moving surface 10. A target 22 is located on the surface of each object 20. Objects 20 may be, for example, electronic components and targets 22 may be, for example, data matrix code symbols, or other indicia typically used for identification.

It is the purpose of scanner 100 to locate target 22 and process an image thereof to extract the data contained in the target's image. Incident light 30 from light source 110 is reflected off of target 22. Reflected light 32 is directed toward lens 120. Lens 120 focuses reflected light 32. Focused light 34 is directed toward image sensor 130. Image sensor 130 may be, for example, a charge coupled device (CCD). Image sensor 130 comprises an array of pixels, each of which receives a portion of focused light 34. Image sensor 130 outputs to A/D convertor 140 an analog signal representing the intensity of the light received by each pixel. A/D convertor 140 digitizes the analog signal and forwards the digital signal to microprocessor 150. Microprocessor 150 processes the digital signal to, among other things, locate target 150 within the field of view of scanner 100. The field of view is defined to be the area that can be imaged onto image sensor 130 by the lens 120.

As moving surface 10 moves past scanner 100, objects 20 move past scanner 100 as well. Typically, the location of object 20 on moving surface 10 is well known. Similarly, the location of target 22 on object 20 is substantially the same for each object. In operation, it is desirable that target 22 be aligned within the field of view as objects 20 move past scanner 100. Thus, once scanner 100 is situated such that a first target 22 is aligned within the field of view, scanner 100 can remain fixed and continue to scan subsequent targets accurately. Throughout the process of aligning target 22 properly within the field of view, scanner 100 is in an alignment mode.

While scanner 100 is in alignment mode, data representing the location of target 22 within the field of view may be transmitted from microprocessor 150 via serial output interface 160 to video display terminal 170. Thus, a user familiar with reading such data can adjust scanner 100 until target 22 is aligned properly within the field of view. Typically, it is desirable that the center of target 22 be aligned in the center of the field of view, although, particularly if target 22 is irregular in shape, the user may align any point on target 22 on any point within the field of view.

Similarly, data representing the field of view is stored within memory buffer 166 and may be transmitted from microprocessor 150 via VIM interface 162 to video image monitor 172. In that case, video image monitor 172 displays a video image of the field of view. Thus, a user can then view VIM 172 to determine the location of target 22 within the field of view (as represented on the display terminal) and adjust scanner 100 until target 22 is aligned properly within the field of view.

Figure 2:
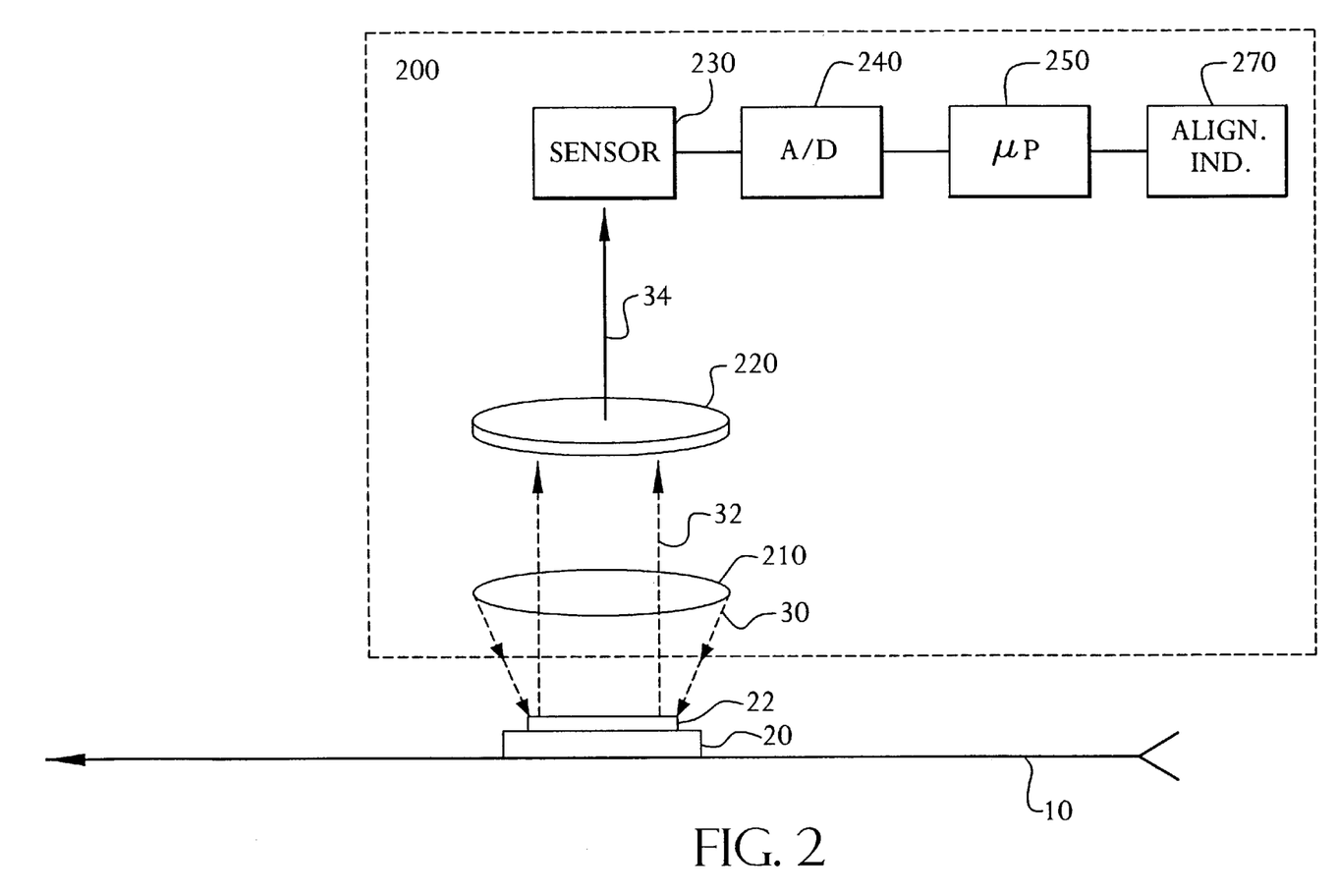
FIG. 2 shows a diagram of an optical scanner including a preferred embodiment of an alignment indicator according to the present invention.

FIG. 2 shows a diagram of an optical scanner 200 comprising a preferred embodiment of an alignment indicator according to the present invention. Scanner 200 comprises a light source 210, a lens 220, an image sensor 230, an analog-to-digital (A/D) convertor 240, a microprocessor 250, and an alignment indicator 270. As shown in FIG. 2, scanner 200 is located above moving surface 10 on which objects 20 are located. A target 22 is located on the surface of each object 20.

Incident light 30 from light source 210 is reflected off of target 22. Reflected light 32 is directed toward lens 220. Lens 220 focuses reflected light 32. Focused light 34 is directed toward image sensor 230. Image sensor 230 may be, for example, a charge coupled device (CCD). Image sensor 230 comprises an array of pixels, each of which receives a portion of focused light 34. Image sensor 230 outputs to A/D convertor 240 an analog signal representing the intensity of the light received by each pixel. A/D convertor 240 digitizes the analog signal and forwards the digital signal to microprocessor 250. As will be described in greater detail below, microprocessor 250, among other things, determines whether target 22 is located within the field of view of scanner 200. If target 22 is located within the field of view of scanner 200, microprocessor 250 also determines in which of one or more zones within the field of view target 22 is located. Microprocessor 250 is electrically connected to alignment indicator 270. In a preferred embodiment, alignment indicator 270 comprises a light emitting diode that is electrically connected to microprocessor 250 via a transistor. Microprocessor 250 sends a signal, or pulse train, to alignment indicator 270 that causes alignment indicator 270 to provide the user with an indication indicating whether target 22 is located within the field of view of scanner 200 and, if so, in which zone target 22 is located.

Figure 3A:
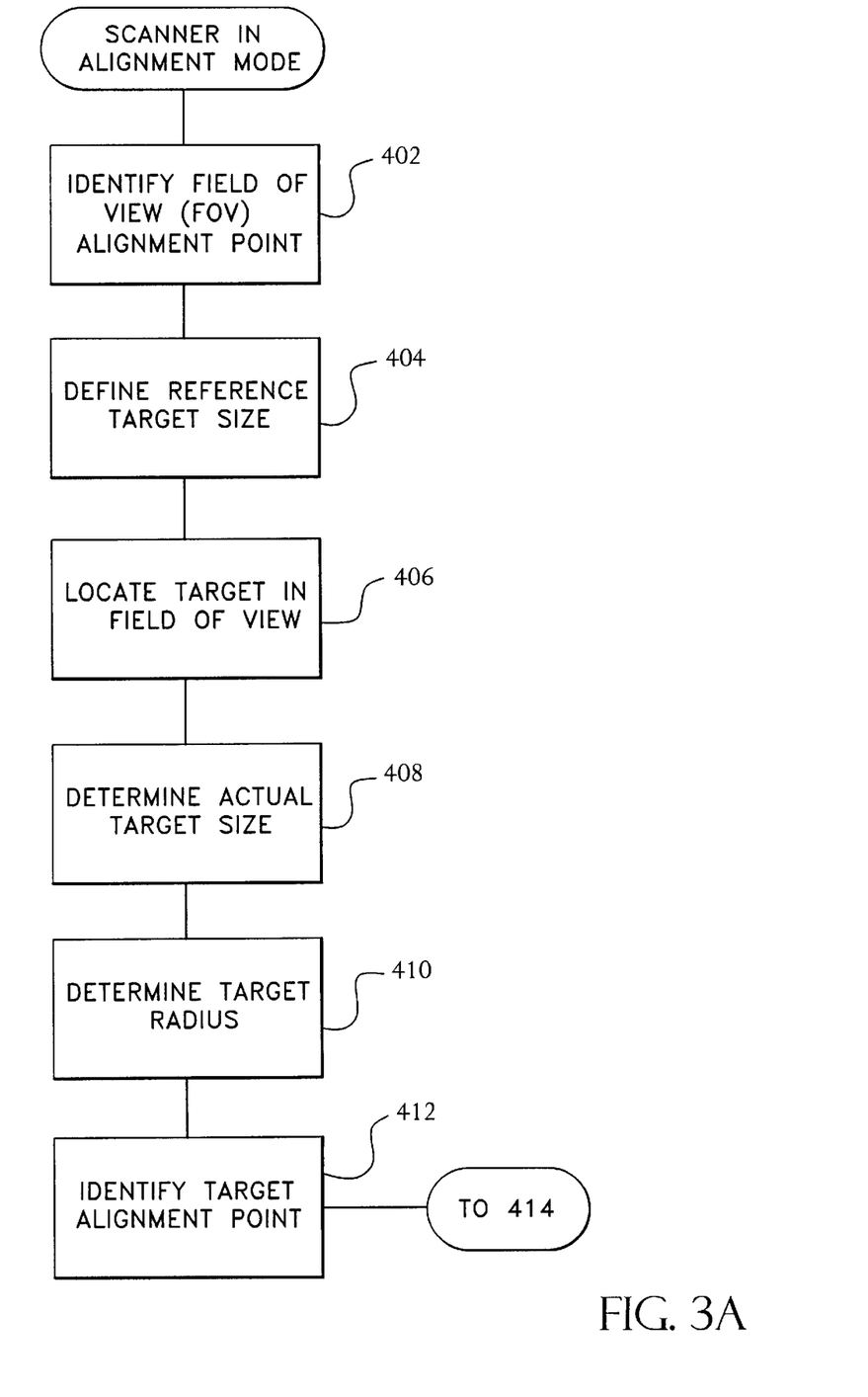
FIGS. 3A and 3B show a flowchart of the steps of a preferred embodiment of an alignment indicator method according to the present invention.
Figure 3B:
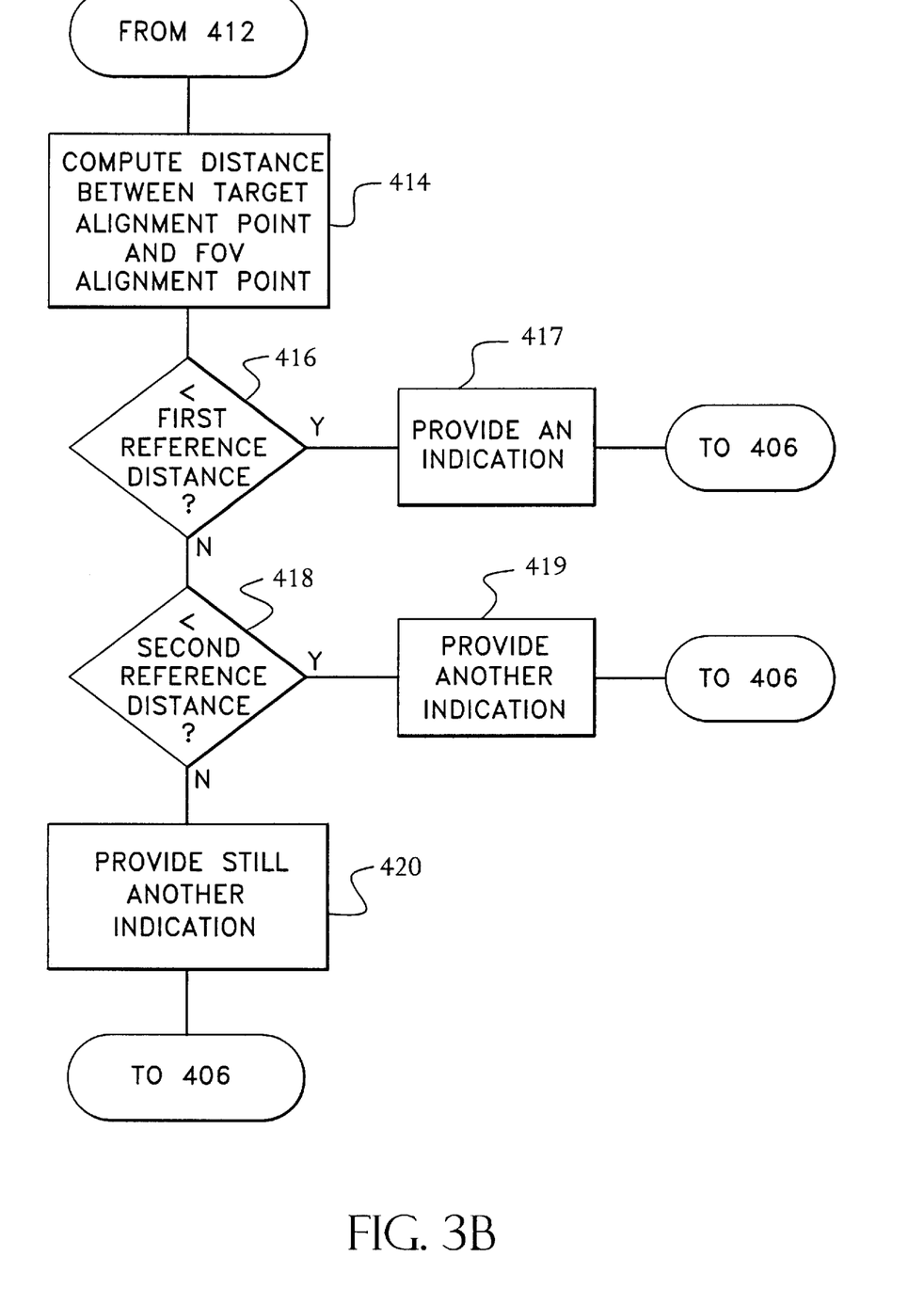
Figure 4:
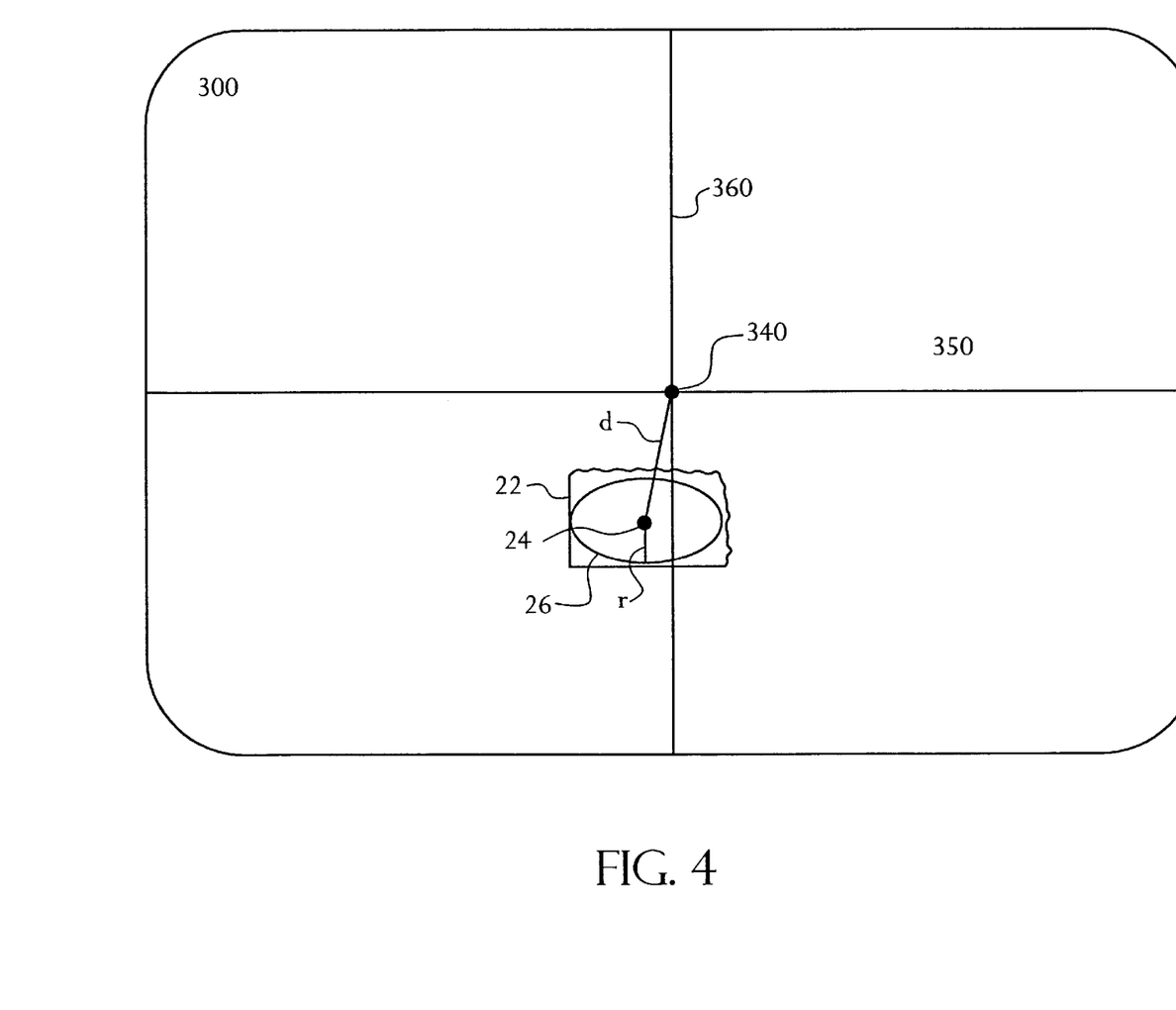
FIG. 4 shows a target within the field of view of an optical scanner.

FIGS. 3A and 3B show a flowchart of a preferred embodiment of a method for aligning a target within the field of view of an optical scanner wherein the optical scanner comprises an alignment indicator. Preferably, the alignment indicator comprises a light emitting diode (LED). The image sensor preferably is a CCD comprising an array of pixels, each of which senses intensity of light incident thereupon. Thus, as shown in FIG. 4, field of view 300 can be represented as an x-y plane, having an x-axis 350 and a y-axis 360. The coordinates on points within field of view 300 are expressed in pixels.

At step 402, an alignment point 340 is defined within field of view 300. Alignment point 340 is a point within field of view 300 on which the user desires target 22 to be aligned, for example, to provide optimal decoding results. Preferably, alignment point 340 is located at the geometric center of field of view 300 (i.e., x=0; y=0). Alignment point 340, however, may be any point within field of view 300.

At step 404, a reference target size is defined. The reference target size represents the "ideal" target size, that is, the target size for which optimal decoding results are obtained. The reference target size is determined experimentally during calibration of the scanner and is measured in pixels squared. In a preferred embodiment in which target 22 is a data matrix code symbol, the reference target size is the number of pixels squared that make up the symbol size that provides optimal decoding results. It is known in the art that a data matrix symbol comprises a plurality of features. Each feature represents certain information contained in the data matrix symbol and comprises a plurality of pixels. The reference target size is determined experimentally during calibration by varying the number of features per symbol, as well as the number of pixels per feature, until optimal decoding results are obtained. Since the number of pixels squared per feature is known, the reference target size can thus be determined by multiplying the number of features by the number of pixels squared per feature.

At step 406, the field of view is scanned until a target is located within the field of view. Any algorithm capable of detecting the presence of a complete data matrix code symbol within the field of view of an optical scanner may be used, and several such algorithms are known in the art. Step 406 is repeated until a complete target is located within the field of view.

Once a target has been located within the field of view, an algorithm is employed at step 408 to determine the actual target size. As with the reference target size, actual target size is measured in pixels squared. Any existing algorithm capable of determining the actual target size may be used, and several such algorithms are known in the art.

At step 410, an algorithm is employed to determine the target radius. In a preferred embodiment in which target 22 is a substantially rectangular data matrix code symbol, the target radius is the minor radius, r, of an ellipse 26 inscribed within target 22 as shown in FIG. 4.

At step 412, an algorithm is employed to determine the coordinates of an alignment point 24 on target 22. In a preferred embodiment in which target 22 is a substantially rectangular data matrix code symbol, alignment point 24 is the geometric center of the symbol. In general, alignment point 24 may be any point on target 22, for example, the center of gravity of an irregularly shaped target. Any of several existing algorithms, such as a "blob analysis" algorithm, may be employed to determine the center of gravity of an irregularly shaped target.

At step 414, an actual distance, d, between alignment point 24 on target 22 and alignment point 340 within field of view 300 is computed from the coordinates of alignment point 24 (and from the coordinates of alignment point 340 if alignment point 340 is not at x=0; y=0 within field of view 300). Actual distance, d, is measured in pixels.

At step 416, actual distance, d, is compared with a first reference distance. The first reference distance is a function of the target radius, the actual target size, and the reference target size and is set such that if the actual distance is less than the first reference distance, the target is aligned properly within the field of view to provide the best possible decoding results. In a preferred embodiment, the first reference distance is computed according to the following algorithm. If the actual target size is less than or equal to the reference target size, the first reference distance is computed to be 90% of the target radius. If the actual target size is greater than the reference target size, then the first reference distance is computed to be 90% of the target radius multiplied by a factor equal to the square root of the ratio of the reference target size to the actual target size. The minimum first reference distance is 25% of the target radius.

The following examples are provided for purposes of illustration and should not be construed to limit the scope of the invention in any way. If the actual target size is half the reference target size, the first reference distance is computed to be 90% of the target radius. If the actual target size is four times the reference target size, the first reference distance is computed to be 45% of the target radius. If the actual target size is 100 times the reference target size is computed to be 25% of the target radius.

If, at step 416, the actual distance is less than the first reference distance, then at step 417 the alignment indicator provides an indication. In a preferred embodiment in which the alignment indicator comprises an LED, if the actual distance is less than the first reference distance, then the indication is provided by turning on the LED and keeping the LED steady on as long as the actual distance remains less than the first reference distance.

If, at step 416, the actual distance is not less than the first reference distance, then, at step 418, the actual distance is compared with a second reference distance. The second reference distance is also function of the target radius, the actual target size, and the reference target size and is set such that if the actual distance is less than the second reference distance, the target is aligned sufficiently well within the field of view to provide acceptable, even if not optimal, decoding results. In a preferred embodiment, the second reference distance is three times the first reference distance.

The following examples are provided for purposes of illustration and should not be construed to limit the scope of the invention in any way. If the actual target size is half the reference target size, the second reference distance is computed to be 2.7 times the target radius. If the actual target size is four times the reference target size, the first reference distance is computed to be 1.35 times the target radius. If the actual target size is 100 times the reference target size is computed to be 75% of the target radius.

If, at step 418, the actual distance is not less than the first reference distance, but less than the second reference distance, then at step 419 the alignment indicator provides another indication. In a preferred embodiment in which the alignment indicator comprises an LED, if the actual distance is not less than the first reference distance, but less than the second reference distance, then the indication is provided by blinking the LED and continuing to blink the LED as long as the actual distance remains greater than the first reference distance and less than the second reference distance.

If, at step 418, the actual distance is not less than the second reference distance, then at step 420 the alignment indicator provides still another indication. In a preferred embodiment in which the alignment indicator comprises an LED, if the actual distance is not less than the second reference distance, then the indication is provided by turning off the LED (if it was blinking or steady on) and keeping it off as long as the actual distance remains not less than the second reference distance.

The process then returns to step 406 and continues as long as scanner 200 is in alignment mode.

To use optical scanner 200 to align target 22 properly within field of view 300, the user locates optical scanner above target 22 and adjusts scanner 200 until alignment indicator 270 provides an indication that the target alignment point is within the first or second zone (e.g., an LED either steady on or blinking). Thus, the user understands that target 22 is within field of view 300. The user continues to adjust scanner 200 until alignment indicator 270 provides an indication that the target alignment point is within the first zone (e.g., an LED steady on). Thus, the user understands that target 22 is aligned properly within field of view 300. Thus, as the user continues to adjust scanner 200, causing target to move about within field of view 300, the user simply looks at alignment indicator 270 to determine whether and when target 22 is aligned properly within field of view 300.

While the invention has been described and illustrated with reference to specific embodiments, those skilled in the art will recognize that modification and variations may be made without departing from the principles of the invention as described hereinabove and set forth in the following claims. For example, it is contemplated that the apparatus and method of the present invention may be used in conjunction with a hand held optical scanner.

We claim:

1. A method for aligning a target within a field of view of an optical scanner, said optical scanner comprising an alignment indicator, said method comprising the steps of:

defining a first zone within said field of view by identifying a field of view alignment point, defining a reference target size, determining an actual target size of said target, determining a target radius of said target, computing a first reference distance, said first reference distance being a function of said reference target size, said actual target size, and said target radius, and defining said first zone to comprise a set of points within said field of view, wherein each point of said set of points is located less than one first reference distance from said field of view alignment point;

determining whether said target is within said field of view; and if said target is within said field of view, identifying a target alignment point on said target;

determining whether said target alignment point is within said first zone; and if said target alignment point is within said first zone, said alignment indicator providing an indication thereof.

2. The method of claim 1, wherein the step of identifying said target alignment point comprises the steps of:

determining a geometric center point on said target; and defining said geometric center point to be said target alignment point.

3. The method of claim 1, wherein the step of identifying said target alignment point comprises the steps of:

determining a center of gravity point on said target; and defining said center of gravity point to be said target alignment point.

4. The method of claim 1, wherein the step of computing said first reference distance comprises the further steps of:

comparing said actual target size to said reference target size;

if said actual target size is less than or equal to said reference target size, defining said first reference distance to be about 90% of said target radius; and if said actual target size is greater than said reference target size, defining said first reference distance to be about 90% of the target radius multiplied by a scale factor.

5. The method of claim 4, wherein said scale factor is approximately the square root of the ratio of said reference target size to said actual target size.

6. The method of claim 4, comprising the further step of:

if said first reference distance is defined to be less than about 25% of said target radius, defining said first reference distance to be about 25% of said target radius.

7. The method of claim 1, wherein the step of determining whether said target alignment point is within said first zone comprises the further steps of:

computing an actual distance between said target alignment point and said field of view alignment point;

comparing said actual distance to said first reference distance;

if said actual distance is less than said first reference distance, determining that said target alignment point is within said first zone; and if said actual distance is not less than said first reference distance, determining that said target alignment point is not within said first zone.

8. The method of claim 1, wherein said alignment indicator comprises a light emitting diode, and wherein the step of said alignment indicator providing an indication comprises lighting said light emitting diode.

9. The method of claim 1, comprising the further steps of:

defining a second zone within said field of view; and if said target is within said field of view, determining whether said target alignment point is within said second zone; and if said target alignment point is within said second zone, said alignment indicator providing another indication.

10. The method of claim 9, wherein said alignment indicator comprises a light emitting diode, and wherein the step of said alignment indicator providing another indication comprises blinking said light emitting diode.

11. The method of claim 9, wherein the step of defining said second zone comprises the steps of:

computing a second reference distance, said second reference distance being a function of said reference target size, said actual target size, and said target radius; and defining said second zone to comprise a set of points within said field of view, wherein each point of said set of points is located less than one second reference distance from said field of view alignment point.

12. The method of claim 11, wherein said second reference distance is about three times said first reference distance.

13. The method of claim 9, comprising the further step of:

if said target alignment point is not within said first zone, and if said target alignment point is not within second zone, said alignment indicator providing still another indication.

14. The method of claim 13, wherein said alignment indicator comprises a light emitting diode, and wherein the step of said alignment indicator providing said still another indication comprises turning off said light emitting diode.

15. In an optical scanner having a field of view, apparatus for indicating whether a target is aligned within said field of view, said apparatus comprising:

a microprocessor, said microprocessor defining a first zone within said field of view and a second zone within said field of view, and determining whether said target is within said field of view, and if said target is within said field of view, said microprocessor identifying a target alignment point on said target and determining whether said target alignment point is within said first zone or said second zone; and if said target alignment point is within said first zone, said microprocessor sending a first signal indicating that said target alignment point is located within said first zone; and if said target alignment point is within said second zone, said microprocessor sending a second signal indicating that said target alignment point is located within said second zone; and an alignment indicator, said alignment indicator electrically connected to said microprocessor, said alignment indicator receiving said first signal from said microprocessor and, in response to said first signal, said alignment indicator providing an indication, said indication indicating that said target alignment point is located within said first zone, and said alignment indicator receiving said second signal from said microprocessor and, in response to said second signal, said alignment indicator providing another indication, said another indication indicating that said target alignment point is located within said second zone.

16. The apparatus of claim 15, wherein if said target alignment point is not located within either said first zone or said second zone, said microprocessor sends a third signal indicating that said target alignment point is not located within either said first zone or said second zone; and wherein said alignment indicator receives said third signal from said microprocessor and, in response to said third signal, said alignment indicator providing still another indication, said still another indication indicating that said target alignment point is not located within either said first zone or said second zone.

17. The apparatus of claim 15, wherein said alignment indicator comprises a light emitting diode.

18. A method for aligning a target within a field of view of an optical scanner, said optical scanner comprising an alignment indicator, said method comprising the steps of:

defining a first zone within said field of view;

defining a second zone within said field of view;

determining whether said target is within said field of view; and if said target is within said field of view, identifying a target alignment point on said target;

determining whether said target alignment point is within said first zone, and, if said target alignment point is within said first zone, said alignment indicator providing a first indication; and determining whether said target alignment point is within said second zone, and, if said target alignment point is within said second zone, said alignment indicator providing a second indication.

19. The method of claim 18, wherein the step of identifying said target alignment point comprises the steps of:

determining a geometric center point on said target; and defining said geometric center point to be said target alignment point.

20. The method of claim 18, wherein the step of identifying said target alignment point comprises the steps of:

determining a center of gravity point on said target; and defining said center of gravity point to be said target alignment point.

21. The method of claim 18, wherein the step of defining said first zone comprises the steps of:

identifying a field of view alignment point;

defining a reference target size;

determining an actual target size of said target;

determining a target radius of said target;

computing a first reference distance, said first reference distance being a function of said reference target size, said actual target size, and said target radius; and defining said first zone to comprise a set of points within said field of view, wherein each point of said set of points is located less than one first reference distance from said field of view alignment point.

22. The method of claim 21, wherein the step of computing said first reference distance comprises the further steps of:

comparing said actual target size to said reference target size;

if said actual target size is less than or equal to said reference target size, defining said first reference distance to be about 90% of said target radius; and if said actual target size is greater than said reference target size, defining said first reference distance to be about 90% of the target radius multiplied by a scale factor.

23. The method of claim 22, wherein said scale factor is approximately the square root of the ratio of said reference target size to said actual target size.

24. The method of claim 22, comprising the further step of:
  if said first reference distance is defined to be less than about 25% of said target radius, defining said first reference distance to be about 25% of said target radius.

25. The method of claim 21, wherein the step of determining whether said target alignment point is within said first zone comprises the further steps of:
  computing an actual distance between said target alignment point and said field of view alignment point;
  comparing said actual distance to said first reference distance;
  if said actual distance is less than said first reference distance, determining that said target alignment point is within said first zone; and
  if said actual distance is not less than said first reference distance, determining that said target alignment point is not within said first zone.

26. The method of claim 18, wherein said alignment indicator comprises a light emitting diode, and wherein one of the steps of said alignment indicator providing said first or second indication comprises lighting said light emitting diode.

27. The method of claim 18, wherein said alignment indicator comprises a light emitting diode, and wherein one of the steps of said alignment indicator providing said first or second indication comprises blinking said light emitting diode.

28. The method of claim 21, wherein the step of defining said second zone comprises the steps of:
  computing a second reference distance, said second reference distance being a function of said reference target size, said actual target size, and said target radius; and
  defining said second zone to comprise a set of points within said field of view, wherein each point of said set of points is located less than one second reference distance from said field of view alignment point.

29. The method of claim 28, wherein said second reference distance is about three times said first reference distance.

30. The method of claim 18, comprising the further step of:
  if said target alignment point is not within said first zone, and if said target alignment point is not within second zone, said alignment indicator providing a third indication.

31. The method of claim 30, wherein said alignment indicator comprises a light emitting diode, and wherein one of the steps of said alignment indicator providing said first, second, or third indication comprises turning off said light emitting diode.

32. In an optical scanner having a field of view, apparatus for indicating whether a target is aligned within said field of view, said apparatus comprising:
  a microprocessor adapted to determine whether said target is within said field of view, and to define a first zone within said field of view by identifying a field of view alignment point, defining a reference target size, determining an actual target size of said target, determining a target radius of said target, computing a first reference distance, said first reference distance being a function of said reference target size, said actual target size, and said target radius, and defining said first zone to comprise a set of points within said field of view, wherein each point of said set of points is located less than one first reference distance from said field of view alignment point, and
  if said target is within said field of view, said microprocessor identifying a target alignment point on said target and determining whether said target alignment point is within said first zone, and
  if said target alignment point is within said first zone, said microprocessor sending a first signal indicating that said target alignment point is located within said first zone; and
  an alignment indicator, said alignment indicator electrically connected to said microprocessor, said alignment indicator receiving said first signal from said microprocessor and, in response to said first signal, said alignment indicator providing an indication, said indication indicating that said target alignment point is located within said first zone.

33. The apparatus of claim 32, wherein said microprocessor is further adapted to define a second zone within said field of view, and
  if said target is within said field of view, said microprocessor determining whether said target alignment point is within said second zone, and
  if said target alignment point is within said second zone, said microprocessor sending a second signal indicating that said target alignment point is located within said second zone;
  wherein said alignment indicator receives said second signal from said microprocessor and, in response to said second signal, said alignment indicator providing a second indication, said second indication indicating that said target alignment point is located within said second zone.

34. The apparatus of claim 33, wherein if said target alignment point is not located within either said first zone or said second zone, said microprocessor sends a third signal indicating that said target alignment point is not located within either said first zone or said second zone;
  wherein said alignment indicator receives said third signal from said microprocessor and, in response to said third signal, said alignment indicator provides a third indication, said third indication indicating that said target alignment point is not located within either said first zone or said second zone.

35. The apparatus of claim 33, wherein said alignment indicator comprises a light emitting diode.

* * * * *